US012607579B2

US 12,607,579 B2

(12) United States Patent
Vašina et al.

(10) Patent No.: US 12,607,579 B2
(45) Date of Patent: Apr. 21, 2026

(54) METHOD AND SYSTEM FOR ORIENTATING A SAMPLE FOR INSPECTION WITH CHARGED PARTICLE MICROSCOPY

(71) Applicant: FEI Company, Hillsboro, OR (US)

(72) Inventors: Radovan Vašina, Brno (CZ); Branislav Straka, Brno (CZ); Jakub Holzer, Židlochovice (CZ)

(73) Assignee: FEI Company, Hillsboro, OR (US)

( * ) Notice: Subject to any disclaimer, the term of this patent is extended or adjusted under 35 U.S.C. 154(b) by 389 days.

(21) Appl. No.: 18/478,593

(22) Filed: Sep. 29, 2023

(65) Prior Publication Data

US 2025/0110069 A1     Apr. 3, 2025

(51) Int. Cl.
| | |
|---|---|
| *G01N 23/20* | (2018.01) |
| *G01N 23/20025* | (2018.01) |
| *G01N 23/20058* | (2018.01) |
| *G01N 23/203* | (2006.01) |

(52) U.S. Cl.
CPC . *G01N 23/20025* (2013.01); *G01N 23/20058* (2013.01); *G01N 23/203* (2013.01); *G01N 2223/0566* (2013.01); *G01N 2223/321* (2013.01)

(58) Field of Classification Search
CPC ....... G01N 23/20025; G01N 23/20058; G01N 23/203; G01N 2223/0566; G01N 2223/321
See application file for complete search history.

(56) References Cited

U.S. PATENT DOCUMENTS

| | | | | |
|---|---|---|---|---|
| 9,093,246 | B2 | 7/2015 | Preikszas | |
| 9,618,463 | B2 | 4/2017 | Unčovský et al. | |
| 10,784,076 | B2 | 9/2020 | Vystavěl et al. | |
| 10,935,505 | B2 * | 3/2021 | Otsuka ............. | G01N 23/20008 |
| 11,114,275 | B2 | 9/2021 | Stejskal et al. | |

(Continued)

OTHER PUBLICATIONS

Britton et al., "Tutorial: Crystal orientations and EBSD—Or which way is up?", Materials Characterization, 2016, vol. 117, pp. 113-126.

(Continued)

*Primary Examiner* — Nicole M Ippolito
(74) *Attorney, Agent, or Firm* — Michael Best & Friedrich LLP

(57) ABSTRACT

In some embodiments, a scientific instrument includes a manipulator configured to controllably rotate a sample, an electron-beam column configured to direct an electron beam to a selected impact point on the sample; and a detector configurable to detect an angularly resolved pattern and a flux of back-scattered electrons. The scientific instrument also includes an electronic controller configured to: determine a first crystal orientation of the sample based on the angularly resolved pattern acquired when the electron-beam column is operated to keep the electron beam fixed at the impact point; operate the manipulator to place the sample into a second crystal orientation in which an angular difference between the determined first crystal orientation and a target crystal orientation is estimated to be canceled; and determine the second crystal orientation based on an SACP acquired when the electron-beam column is operated to rock the electron beam at the impact point.

20 Claims, 9 Drawing Sheets

(56) References Cited

U.S. PATENT DOCUMENTS

| 11,513,079 | B2 | 11/2022 | Alvis et al. | |
| 11,650,171 | B2 * | 5/2023 | Han | H01J 37/28 |
| | | | | 250/307 |
| 2017/0365441 | A1 * | 12/2017 | Bedell | H01J 37/26 |
| 2018/0211378 | A1 | 7/2018 | Bedell et al. | |
| 2020/0066481 | A1 * | 2/2020 | Mori | H01J 37/20 |

OTHER PUBLICATIONS

Gutierrez-Urrutia et al., "Coupling of Electron Channeling with EBSD: Toward the Quantitative Characterization of Deformation Structures in the SEM," TMS, 2013, vol. 65, pp. 1229-1236.
Holzer et al., "Large area EBSD mapping using a tilt-free configuration and direct electron detection sensor," Microscopy and Microanalysis, 2021, vol. 27, Supp. 1, pp. 1832-1835.

* cited by examiner

400

600

800

400 nm

900

METHOD AND SYSTEM FOR ORIENTATING A SAMPLE FOR INSPECTION WITH CHARGED PARTICLE MICROSCOPY

TECHNICAL FIELD

Various examples relate generally, but not exclusively, to charged particle microscopy components, instruments, systems, and methods.

SUMMARY

One example provides a scientific instrument comprising: a manipulator configured to controllably rotate a sample about a first rotation axis and about a second rotation axis oriented at a non-zero angle with respect to the first rotation axis; an electron-beam column configured to direct an electron beam to a selected impact point on the sample; one or more detectors configurable to detect an angularly resolved pattern of back-scattered electrons emitted from the selected impact point in response to the electron beam and further configurable to detect a flux of back-scattered electrons emitted from the selected impact point in response to the electron beam; and an electronic controller configured to: determine a first crystal orientation of a region of interest (ROI) within the sample based on the angularly resolved pattern of back-scattered electrons acquired with the one or more detectors when the electron-beam column is operated to keep the electron beam at a first impact point within the ROI; operate the manipulator to place the ROI into a second crystal orientation in which an angular difference between the determined first crystal orientation and a target crystal orientation is estimated to be substantially canceled; and determine the second crystal orientation based on a first selected area electron channeling pattern (SACP) acquired with the one or more detectors when the scientific instrument is operated to rock the electron beam relative to the sample at a second impact point within the ROI.

In some examples, the one or more detectors are implemented using a single movable pixelated BSE detector.

In some other examples, the one or more detectors include a first BSE detector configurable to detect the angularly resolved pattern of back-scattered electrons emitted from the selected impact point in response to the electron beam; and a different second BSE detector configurable to detect the flux of back-scattered electrons emitted from the selected impact point in response to the electron beam.

Another example provides an automated method comprising: acquiring an electron backscatter diffraction pattern (EBSD) with one or more detectors when an electron-beam column is operated to direct an electron beam at a first impact point within a region of interest (ROI) of a sample held by a sample holder; determining a first crystal orientation of the ROI based on the acquired EBSD; operating a manipulator coupled to the sample holder to place the ROI into a second crystal orientation to substantially cancel an angular difference between the determined first crystal orientation and a target crystal orientation; acquiring a first selected area electron channeling pattern (SACP) of the ROI placed in the second crystal orientation with the one or more detectors when the electron beam is operated to rock the electron beam at a second impact point within the ROI; and determining the second crystal orientation based on the acquired first SACP.

Yet another example provides a non-transitory computer-readable medium storing instructions that, when executed by a computing device, cause the computing device to perform operations comprising the above automated method.

Yet another example provides a scientific instrument comprising: an electron-beam column configured to direct an electron beam to a sample; a manipulator configured to adjust an orientation of the sample with respect to the electron beam; one or more detectors to detect back-scattered electrons from the sample; and an electronic controller including a processor and a memory for storing program code, wherein the memory and the program code are configured to, with the processor, cause the scientific instrument at least to: direct the electron beam toward a ROI of the sample and acquire at least one EBSD pattern with the one or more detectors; adjust, via the manipulator, the orientation of the sample toward a target crystal orientation based on the EBSD; direct the electron beam toward the ROI and acquire a first SACP with the one or more detectors; and adjust, via the manipulator, the orientation of the sample toward the target crystal orientation based on the first SACP.

Yet another example provides a scientific instrument comprising: an electron-beam column configured to direct an electron beam to a sample; a manipulator configured to adjust an orientation of the sample with respect to the electron beam; one or more detectors to detect back-scattered electrons from the sample; and an electronic controller including a processor and a memory for storing program code, wherein the memory and the program code are configured to, with the processor, cause the scientific instrument at least to: direct the electron beam toward a ROI of the sample and acquire at least one EBSD pattern with the one or more detectors; adjust, via the manipulator, the orientation of the sample toward a target crystal orientation based on the EBSD; direct the electron beam toward the ROI and acquire an electron channeling pattern (ECP) with the one or more detectors; and adjust, via the manipulator, the orientation of the sample toward the target crystal orientation based on the ECP.

Yet another example provides a scientific instrument comprising: an electron-beam column configured to direct an electron beam to a sample; a manipulator configured to adjust an orientation of the sample with respect to the electron beam; one or more detectors to detect back-scattered electrons from the sample; and an electronic controller including a processor and a memory for storing program code, wherein the memory and the program code are configured to, with the processor, cause the scientific instrument at least to: direct the electron beam toward a region of interest (ROI) of the sample and acquire at least one electron backscatter diffraction (EBSD) pattern with the one or more detectors; adjust, via the manipulator, the orientation of the sample toward a target crystal orientation based on the EBSD; direct the electron beam toward the ROI and acquire a first selected area electron channeling pattern (SACP) with the one or more detectors; and adjust, via the manipulator, the orientation of the sample toward the target crystal orientation based on the first SACP.

BRIEF DESCRIPTION OF THE DRAWINGS

The foregoing aspects and many of the attendant advantages pertaining to the present disclosure will become more readily appreciated as the same become better understood by reference to the following detailed description, when taken in conjunction with the accompanying drawings, in which.

DETAILED DESCRIPTION

Figure 1:
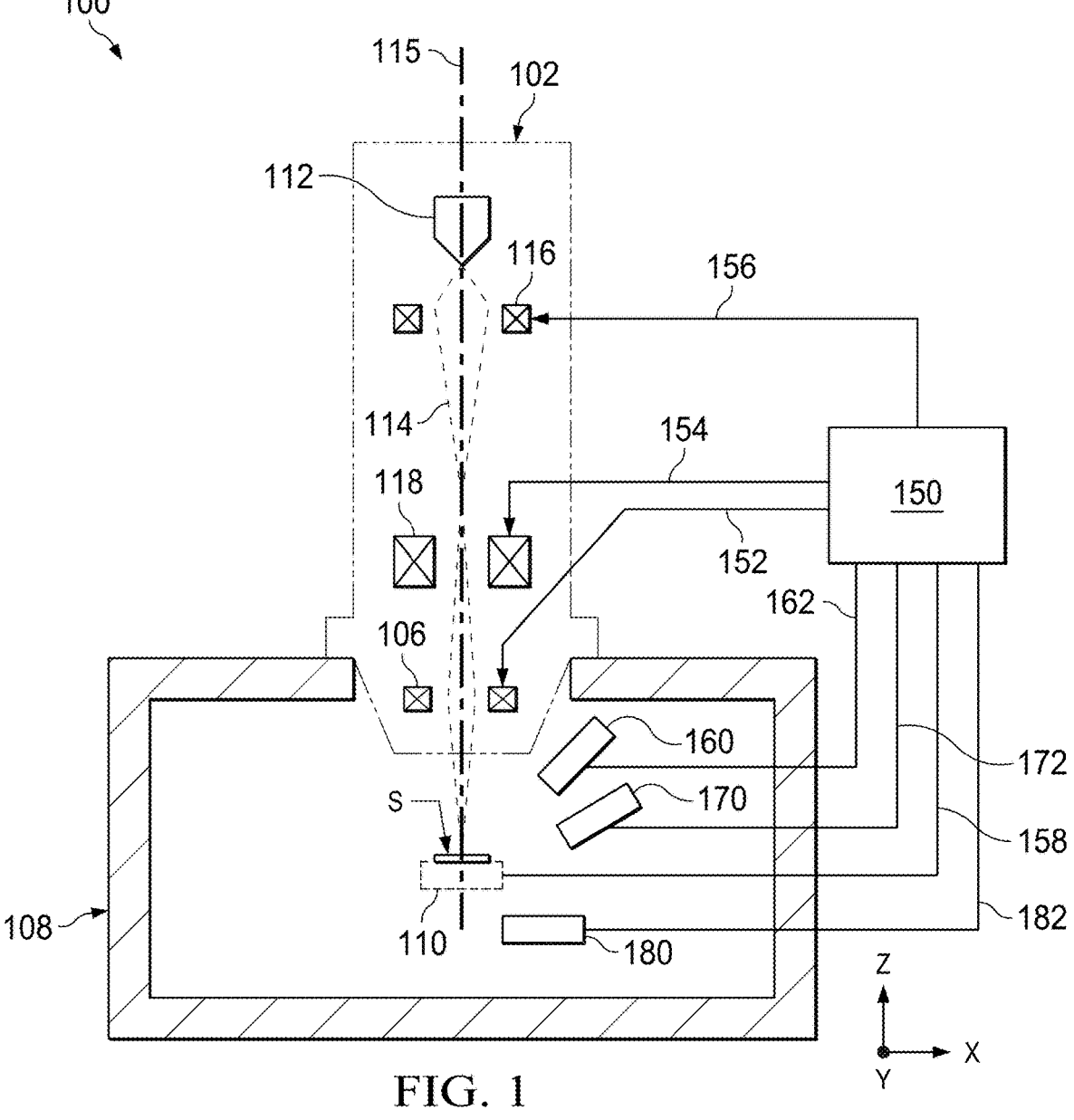
FIG. 1 is a block diagram illustrating an example scientific instrument in accordance with some embodiments.

Accurately determining the crystal orientation of a sample is a critical prerequisite for sample high-quality imaging and/or processing using a charged particle microscope. Based on the determined crystal orientation, the sample can be orientated so that the charged particle beam is aligned with the sample's crystalline structure. For example, the sample has to be placed in an electron channeling condition based on its crystal orientation in order to perform electron channeling contrast imaging (ECCI). In another example, an atomic plane of the sample may be selected based on the crystal orientation, and a lamella is extracted by cutting along the selected atomic plane to be further inspected in a transmission electron microscopy (TEM) system. Applicant recognizes that the electron backscatter diffraction (EBSD) pattern, the electron channeling pattern (ECP), and the selected area electron channeling pattern (SACP) can all determine the crystal orientation. EBSD is formed by acquiring angularly resolved back-scattered electrons emitted from an impact point in response to the electron beam irradiating the impact point. ECP and SACP are formed by acquiring back-scattered electrons with respect to variations in the e-beam incidence directions in respect to the sample's crystalline structure. ECP can be acquired by scanning a relatively large sample area, and SACP is acquired by either rocking the beam and/or the sample while directing the electron beam to substantially one impact point or a small sample area. ECP and SACP based crystal orientation estimation has a higher angular resolution and accuracy comparing to EBSD. However, since ECP and SACP inspect less angular range comparing to EBSD. ECP or SACP along may not uniquely determine the crystal orientation since both methods recognize only a small part of the reciprocal space. In order to obtain the complete information, especially on the polycrystalline materials, one needs the context provided by the EBSD method.

In order to address the above issues, the sample is orientated first based on EBSD, and then on ECP or SACP. In some examples, an initial rough alignment of the sample under test (SUT) into the Bragg condition for a selected set of crystal lattice planes is performed with a lower angular accuracy (e.g., about 1 degree) based on an electron backscatter diffraction (EBSD) pattern. The initial rough alignment is then refined to a higher angular accuracy (e.g., better than about one tenth of a degree) based on one or more selected area SACPs acquired after orienting the sample based on the EBSD. By performing the ECP/SACP after orientating the sample based on the EBSD, the crystal orientation of the sample may be more quickly and accurately estimated than based on either one of the EBSD or SACP. In some examples, the crystal orientation may be determined based on either ECP or SACP. However, for certain type of sample, such as polycrystalline sample, SACP is preferred because it can be acquired by inspecting a smaller sample area comparing to ECP.

In some examples, the EBSD is acquired with a retractable two dimensional (2D) pixelated BSE detector. The SACP is acquired with an annular BSD detector, which may also be used for scanning electron microscopy (SEM) imaging. The SACP may be acquired after retracting the 2D pixelated BSE detector. The sample remains on the sample holder during and between the EBSD acquisition and the SACP acquisition. The sample orientation is adjusted by a manipulator coupled to the sample holder. The electronic controller applies suitable processing algorithms to determine adjustments to the two rotation angles of the SUT and operates the sample manipulator to perform the corresponding rotations. In some examples, instead of orienting the sample around 70 degrees relative to the incident electron beam, the EBSD is acquired by positioning the 2D pixelated BSE detector between the polepiece of the electron column and the sample. The 2D pixelated BSE detector may be positioned substantially normal to the beam axis of the electron column.

In some examples, once the SUT is oriented in the two-beam diffraction condition based on the SACP, the electron-beam column and the annular BSE detector may be switched into an SEM-imaging mode to perform (Electron channeling contrast imaging) ECCI. Beneficially, the acquired SEM images have an optimal contrast for clearly visualizing various lattice defects present in the SUT.

ECCI is a scanning electron microscope (SEM) technique that makes use of a strong dependence of the back-scattered electron (BSE) signal on the orientation of the crystal lattice planes with respect to the incident electron beam due to the electron channeling mechanism. Local distortions in the crystal lattice produced by the strain fields associated with certain lattice defects, such as dislocations, grain boundaries, stacking faults, point defects, and deformation twins, typically impose a modulation onto the BSE signal that can be detected with a suitable BSE detector. As a result, the corresponding lattice defects can be visualized in SEM images.

According to the dynamical theory of electron diffraction, an optimal contrast for imaging lattice defects via ECCI is obtained when the crystalline sample under test is oriented substantially exactly into the Bragg condition for a selected set of crystal lattice planes (i.e., in the electron channeling condition or two-beam diffraction condition. Even a small deviation from the precise orientation can lead to a significant decrease of the ECCI contrast, and sample orientation with an accuracy of about 0.1° is typically needed for defects characterization and metrology. As such, fast and accurate methods for properly orienting the SUT in the SEM instrument are of great importance to various ECCI applications.

FIG. 1 is a block diagram illustrating a scientific instrument 100 in accordance with some embodiments. The scientific instrument 100 includes an SEM column 102 coupled to a vacuum chamber 108. The vacuum chamber

108 houses therein a movable sample holder 110 and can be evacuated using one or more vacuum pumps (not explicitly shown in FIG. 1). A sample S to be interrogated using the scientific instrument 100 is mounted in the sample holder 110 as indicated in FIG. 1.

In some embodiments, the sample holder 110 is independently movable parallel to the XY-coordinate plane and parallel to the Z-coordinate axis, with the corresponding coordinate system being indicated by the XYZ-coordinate triad shown in FIG. 1. In some embodiments, the sample holder 110 is rotatable with respect to the XYZ-coordinate frame with or without translation. In some examples, the sample holder 110 includes a goniometer that is independently rotatable at least about eucentric tilt and azimuthal rotation axes that are mutually orthogonal. In other examples, the goniometer may implement rotations about other suitable types of non-parallel rotation axes. An electronic controller 150 operates to generate a control signal 158, in response to which the sample holder 110 translates and/or rotates the sample S by the specified amounts. An example sample holder suitable for rotating the sample S and adjusting the sample location relative to the electron beam is disclosed in U.S. Pat. No. 10,784,076, which is incorporated herein by reference in its entirety.

In the example shown, the SEM column 102 comprises an electron source 112 and two or more electron-beam lenses, only two of which, i.e., an objective lens 106 and a condenser lens 116, are schematically shown in FIG. 1 for illustration purposes. In some examples, a different (from two) number of such lenses may be used in the SEM column 102. In some embodiments, the objective lens 106 can be an ultra-high-resolution (UHR) lens.

In operation, the electron source 112 generates an electron beam 114 propagating generally along a longitudinal axis 115 of the SEM column 102. Electron-beam lenses 106 and 116 are operated to generate electric and magnetic fields that affect electron trajectories in the electron beam 114. The scientific instrument 100 includes the electronic controller 150. The electronic controller 150 may include a processor (e.g., 902, FIG. 9) and a memory (e.g., 904, FIG. 9) for storing computer readable instructions. In various examples, by executing the computer readable instructions stored in the memory, the electronic controller 150 implements at least some of the methods disclosed herein. For example, control signals 152, 156 generated by the electronic controller 150 are used to change the strengths and/or spatial configurations of the fields and impart desired properties on the electron beam 114. In general, the electron-beam lenses 106 and 116, control signals 152 and 156, and other pertinent components of the scientific instrument 100 can be used to perform various operations and support various functions, such as beam focusing, aberration mitigation, aperture cropping, filtering, etc. The SEM column 102 further comprises a deflection unit 118 that can steer the electron beam 114 in response to a control signal 154 applied thereto by the electronic controller 150. Such beam steering can be used, e.g., to move a focused portion of the electron beam 114 along a desired path across the sample S to perform a raster or vector scan thereof and/or to change the incidence angle of the electron beam 114 at the sample S.

The scientific instrument 100 also includes detectors 160, 170, 180 located in the vacuum chamber 108 in relatively close proximity to the sample S. In operation, the detectors 160, 170, and 180 generate streams of measurements 162, 172, and 182, which are received by the electronic controller 150. Specific types of the detectors 160, 170, 180 depend on the embodiment of the scientific instrument 100 and can typically be chosen from a variety of detector types suitable for detecting different types of emission and/or radiation from the sample S produced thereby in response to the electron beam 114. Example types of the emission/radiation that can be produced in this manner include, but are not limited to, X-rays, infrared light, visible light, ultraviolet light, back-scattered electrons, secondary electrons, Auger electrons, elastically scattered electrons, non-scattered (e.g., zero energy loss) electrons, and non-elastically scattered electrons. In various embodiments, a different (from three) number of such detectors can be used in the scientific instrument 100. In some embodiments, some or all of the detectors 160, 170, 180 are retractable and/or replaceable without equilibrating the vacuum chamber 108 to the atmospheric pressure or opening up the vacuum chamber 108. In some embodiments, the detectors 160, 170, 180 are selected from the group consisting of, an annular detector, a segmented annular detector, a differential phase contrast detector, a two-dimensional (e.g., pixelated or segmented) diffraction-pattern detector, a BSE detector, an electron backscatter diffraction (EBSD) detector, and a forescattered electron (FSE) detector. Other detectors capable of detecting various ones of the above-mentioned types of emission/radiation can also be used in various additional embodiments.

Figure 2:
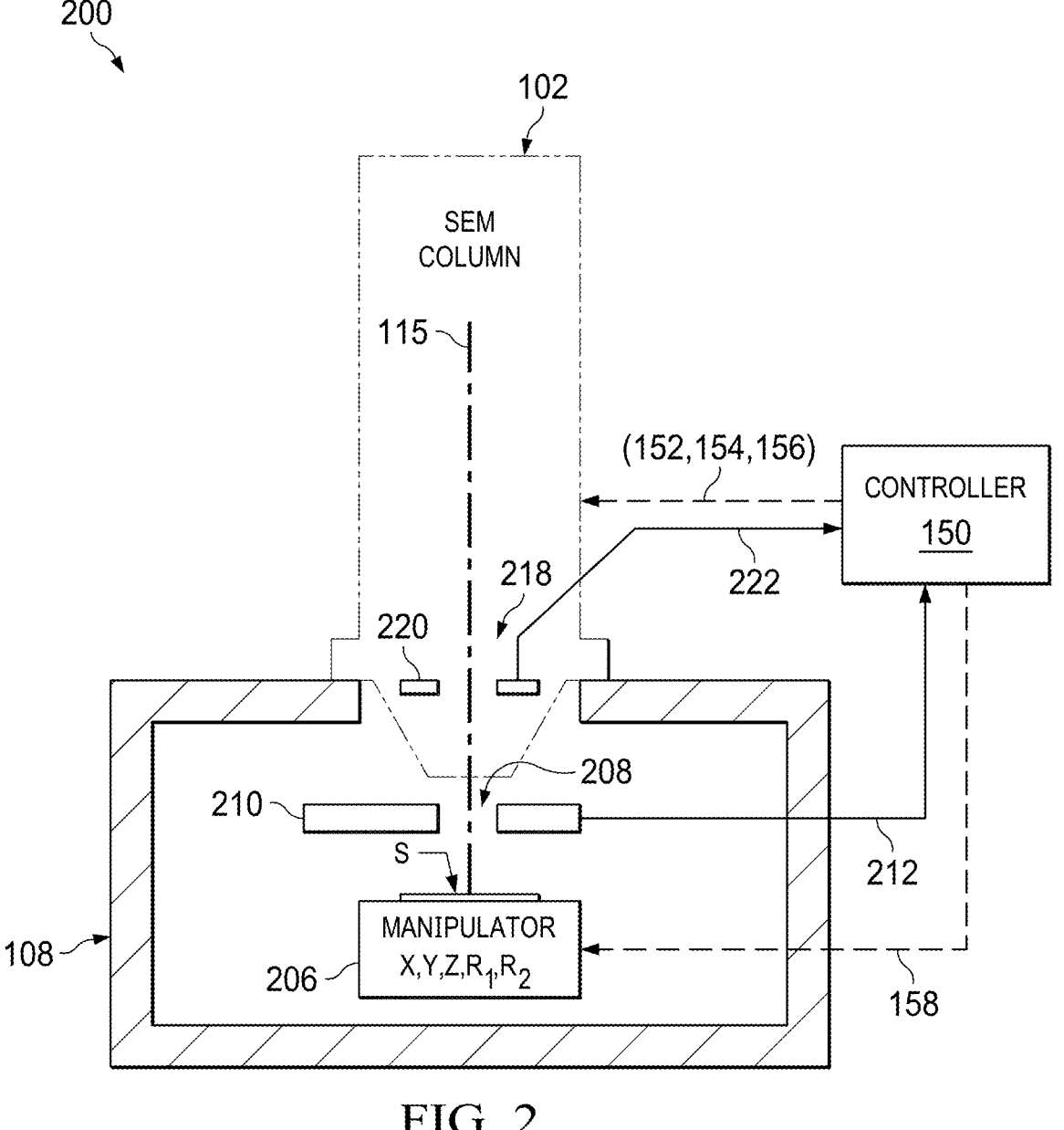
FIG. 2 is a block diagram illustrating a scientific instrument according to another example.

FIG. 2 is a block diagram illustrating a scientific instrument 200 according to another example. The scientific instrument 200 includes some of the same elements as the scientific instrument 100, which elements are indicated by the same reference numerals as in FIG. 1. The scientific instrument 200 includes one or more BSE detectors, such as one or both of detectors 210 and 220, for detecting backscattered electrons generated when the electron beam 114 (also see FIG. 1) impinges upon the sample S and further configured to communicate respective detected BSE signals 212, 222 to the electronic controller 150. In one example, the BSE detector 210 is a retractable detector for acquiring EBSD patterns. The BSE detector 220 is an annular detector for acquiring SACPs. In various examples, the BSE detector 220 is either a fixed detector or a retractable detector. When the BSE detector 210 is deployed and is in the position indicated in FIG. 2, the BSE detector 220 is idle (e.g., is not performing measurements). When the BSE detector 210 is retracted from the shown position, the BSE detector 220 can be activated to perform BSE measurements. When in use, the BSE detector 220 can perform SACP measurements or SEM image acquisition at different respective times and in different respective operating modes of the scientific instrument 100. In various examples, such different operating modes employ similar probe geometries that substantially preserve relevant geometric relationships between the electron beam 114 and the sample S.

In the example shown, both of the BSE detectors 210 and 220 have respective openings 208, 218 that are aligned with the longitudinal axis 115 of the SEM column 102 to allow the electron beam 114 to pass through and strike the sample S. The scientific instrument 200 includes an automated manipulator 206 with five degrees of freedom including X, Y, and Z translations and $R_1$ and $R_2$ rotations. In some examples, the manipulator 206 includes the sample holder 110. In some other examples, the sample holder 110 is coupled to the manipulator 206 in a manner consistent with desired translations and/or rotations of the sample S. In some examples, movements corresponding to various degrees of freedom of the manipulator 206 are controlled by the electronic controller 150 via the control signal 158 as mentioned above.

In some embodiments, instead of the shown two BSE detectors 210 and 220, the detector configuration 200 may employ a more-versatile single BSE detector designed and configured to perform several types of BSE measurements, including the BSE measurements performed with the BSE detectors 210 and 220 in the embodiment illustrated in FIG. 2. In some examples, such single BSE detector is a movable 2D pixelated BSE detector characterized by a relatively fast readout time. In some examples, different respective pixel-binning configurations and/or positions of such single BSE detector are used to perform the measurements that functionally correspond to the measurements performed with the illustrated BSE detectors 210 and 220. For illustration purposes and without any implied limitations, example embodiments are described herein below in reference to the detector configuration 200 employing the illustrated BSE detectors 210 and 220. Based on the provided description, a person of ordinary skill in the pertinent art will readily understand how to make and use the corresponding embodiments employing a single movable 2D pixelated BSE detector without any undue experimentation.

Figure 3:
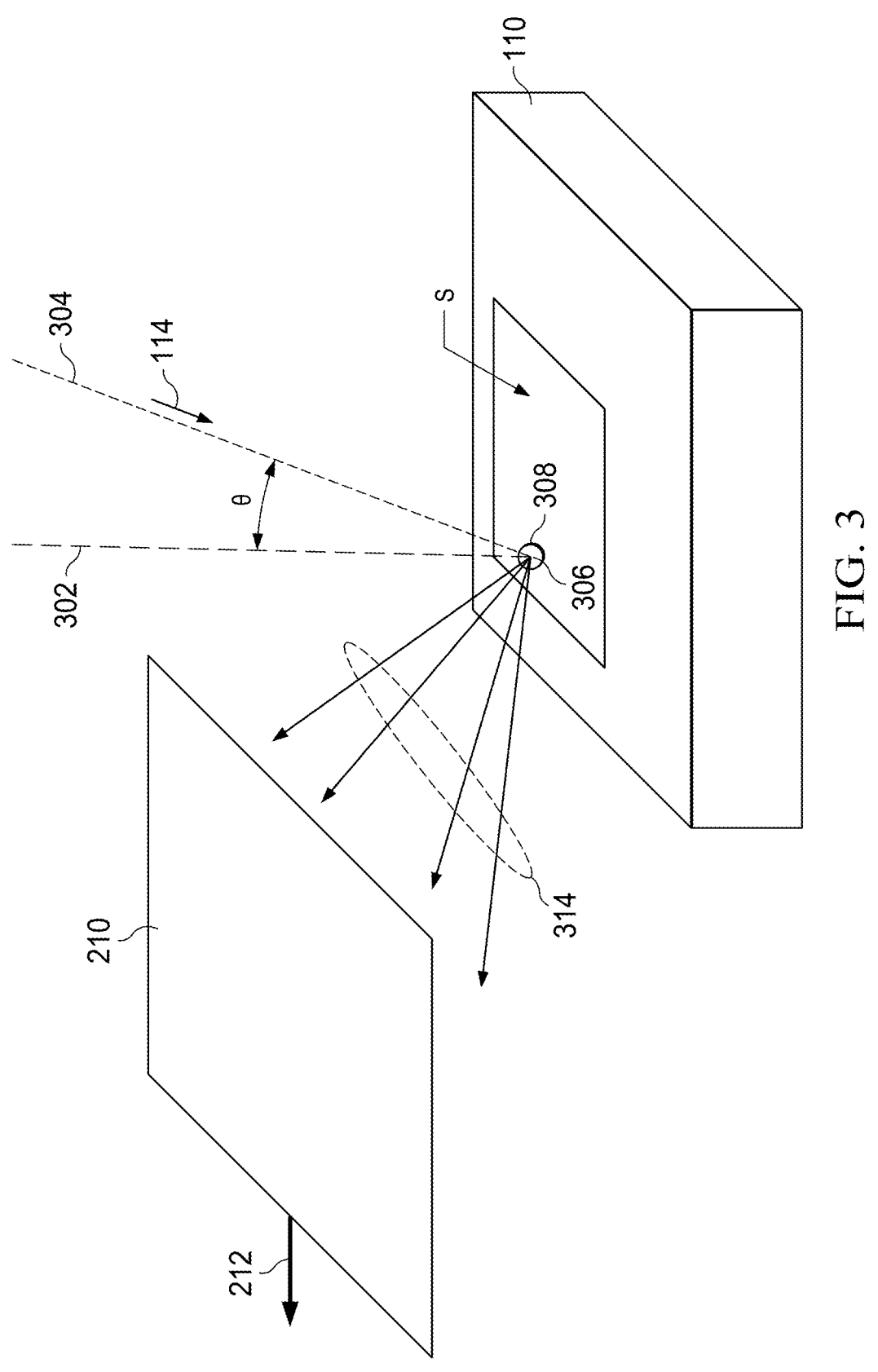
FIG. 3 is a block diagram illustrating acquisition of a 2D electron diffraction pattern using the detector configuration of FIG. 2 according to one example.

FIG. 3 is a block diagram illustrating acquisition of an electron diffraction pattern using the BSE detector 210 according to one example. In the example shown, the electron beam 114 irradiates the sample S by propagating thereto along an irradiation axis 304. The electron beam 114 strikes the sample S at an impact point 306 within a region of interest (ROI) 308 of the sample surface. The impact point 306 includes a volume of the sample S that the elections of the beam 114 interact with. In one example, a normal 302 to the top surface of the sample S is oriented at a tilt angle θ relative to the irradiation axis 304, which remains fixed during the EBSD signal acquisition. Such EBSD pattern may be acquired with the scientific instrument 100 of FIG. 1 or with the scientific instrument 200 of FIG. 2. In another example, the sample S is not tilted with respect to the irradiation axis 304. In such an example, the normal 302 to the sample surface and the irradiation axis 304 are colinear. That is, the tilt angle θ is θ=0. As a result, the 2D pixel array of the retractable detector 210 is oriented parallel to the top surface of the sample S and perpendicular to the irradiation axis 304. When the impact point 306 is irradiated by the electron beam 114, back-scattered electrons 314 emitted from the impact point 306 are detected in an angularly resolved manner by the corresponding BSE detector, e.g., the 2D pixel array of the BSE detector 210. Values of the signals accumulated by individual pixels of the pixel array during the irradiation interval (dwell time) are read out therefrom and are sent to the electronic controller 150 via the corresponding output signal 212.

Figure 4:
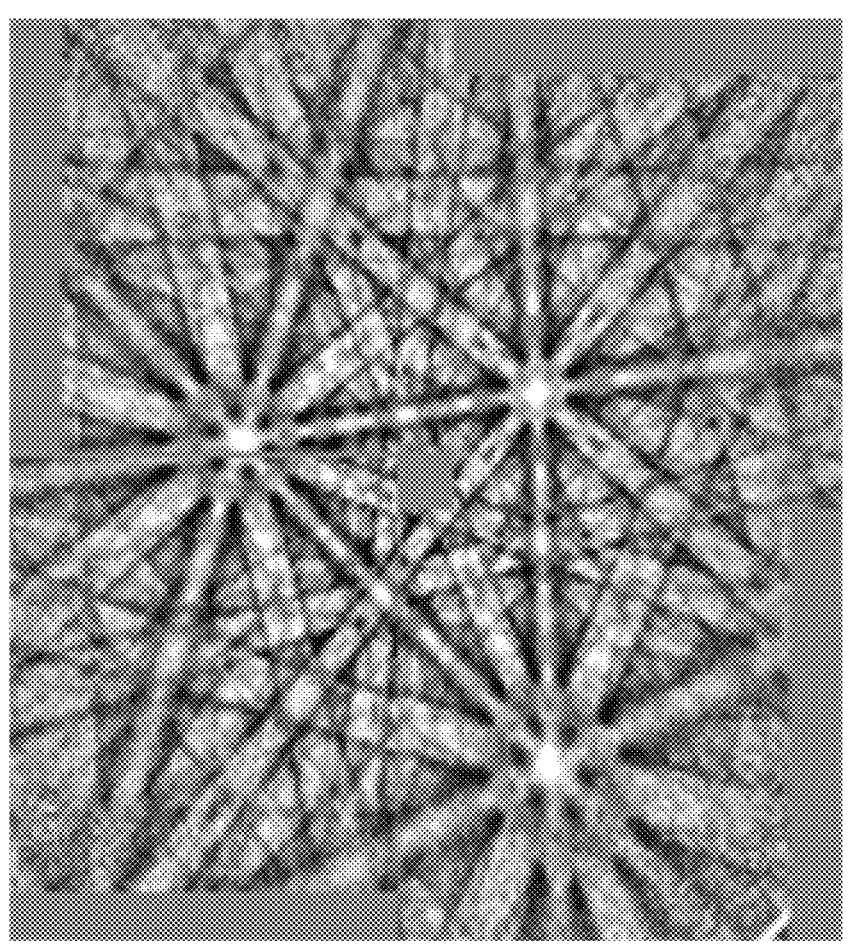
FIG. 4 illustrates an electron diffraction pattern captured using the acquisition process of FIG. 3 according to one example.

FIG. 4 illustrates an EBSD pattern 400 captured using the acquisition setup of FIG. 2 according to one example. In the example shown, the sample S is an electropolished tungsten specimen. The EBSD pattern 400 has multiple sets of parallel line pairs, typically referred to as Kikuchi line pairs (or bands). Spacing and configuration of the pairs correspond to particular crystallographic structure and orientation. Places in the EBSD pattern 400 where different Kikuchi line pairs intersect are referred to as zone axes. Angles between the lines connecting different zone axes are indicative of the crystal structure of the sample S. These and other features of the EBSD pattern 400 can be quantified using a suitable EBSD-pattern processing algorithm. Based on such quantification, a crystal orientation of the sample S at the impact point 306 with respect to the irradiation axis 304 can be determined. A typical accuracy with which the crystal orientation is determined from an EBSD pattern, such as the EBSD pattern 400, is approximately 1 to 2 degrees.

In one example, the crystal orientation is determined by matching the EBSD pattern 400 to one of known EBSD patterns (or computer-simulated versions thereof). In another example, the crystal orientation is calculated by comparing the measured angles between the Kikuchi bands with theoretical interplanar angles determined using standard crystallographic principles. Several other EBSD-pattern processing algorithms suitable for crystal-orientation determination are reviewed, e.g., in T. B. Britton, J. Jiang, Y. Guo, et al., "Tutorial: Crystal orientations and EBSD—Or which way is up?", Materials Characterization, 2016, v. 117, pp. 113-126, which is incorporated herein by reference in its entirety.

Figure 5:
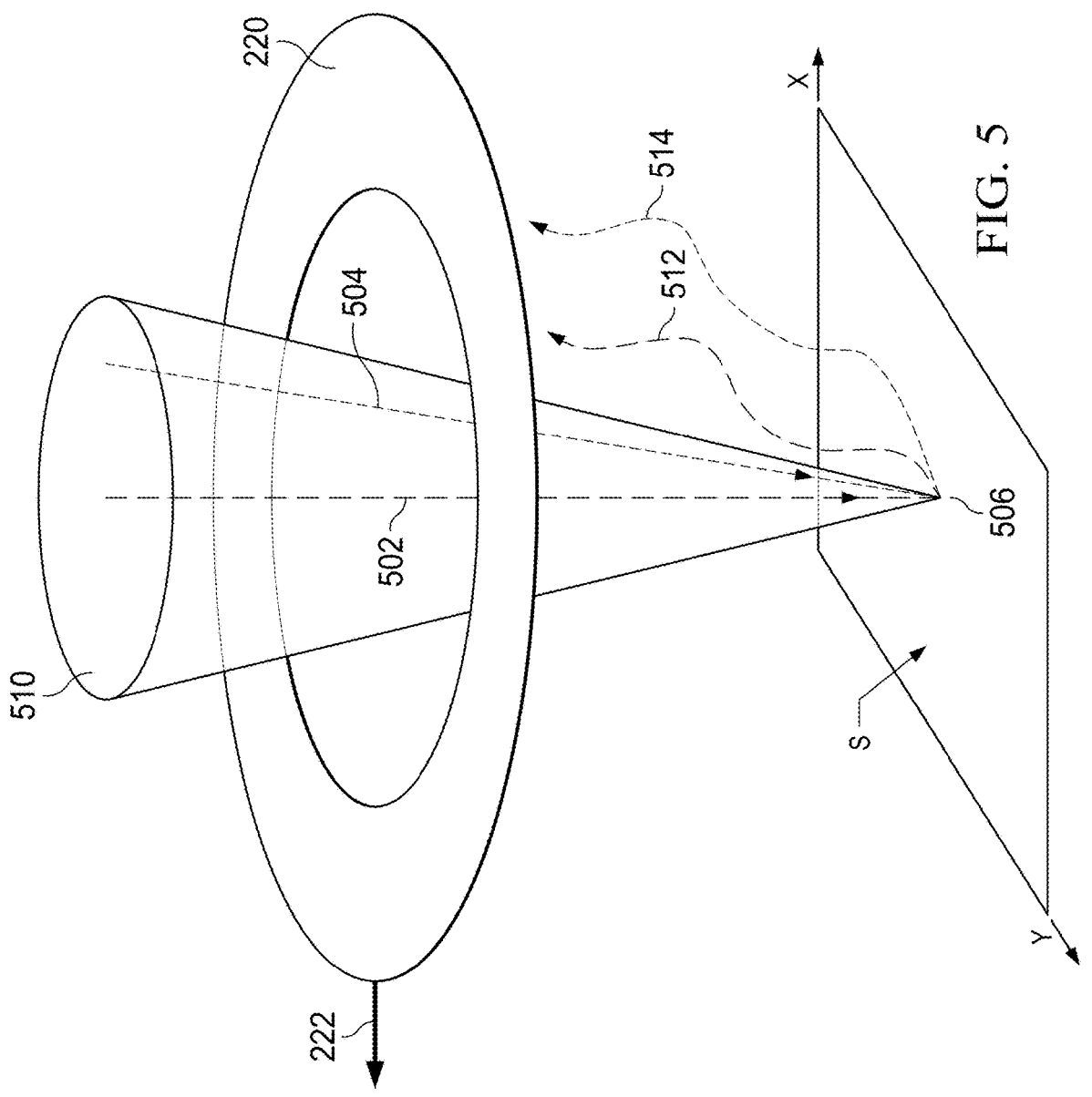
FIG. 5 is a block diagram illustrating SACP measurements using the detector configuration of FIG. 2 according to one example.

FIG. 5 is a block diagram illustrating SACP measurements with the annular BSE detector 220 according to one example. Note that the detector configuration shown in FIG. 5 may be obtained in an SACP mode of the scientific instrument 200 shown in FIG. 2, wherein the BSE detector 210 is retracted away from the position indicated in FIG. 2. To acquire an SACP, the SEM column 102 is operated to direct the electron beam 114 to an impact point 506 on the surface of the sample S and vary the incidence angle of the electron beam 114 in a process often referred to as beam rocking. The incidence angle of the electron beam can be adjusted by adjusting the electron column to change the direction of the electron beam relative to the beam axis, and/or the manipulator to change the orientation of the sample with respect to the beam axis. An example SEM-column configuration that can be used for beam rocking is disclosed, e.g., in U.S. Pat. No. 9,093,246, which is incorporated herein by reference in its entirety.

In operation, the incidence angle of the electron beam 114 is varied by the SEM column 102 to sample different incidence angles, e.g., within a cone 510. In some examples, the cone 510 is a circular or elliptical cone having an apex angle in the range between about 0.05 degree and about 15 degrees. In some pertinent literature, the apex angle is also referred to as "convergence" angle. In some examples, the convergence angle is about 0.5 degree. Two different incidence angles corresponding to electron-beam propagation directions 502 and 504 are illustrated in FIG. 5 as an example. At different ones of the incident angles within the cone 510, the BSE detector 220 is operated to capture and measure the corresponding BSE signals. Two of such BSE signals, labeled 512 and 514, are illustrated in FIG. 5. The BSE signal 512 is generated when the electron beam 114 strikes the impact point 506 from the propagation direction 502. The BSE signal 514 is similarly generated when the electron beam 114 strikes the impact point 506 from the propagation direction 504. Values of the BSE signals corresponding to different electron-beam propagation directions captured by the BSE detector 220 during the corresponding time intervals are read out therefrom and sent to the electronic controller 150 via the output signal 222.

Figure 6:
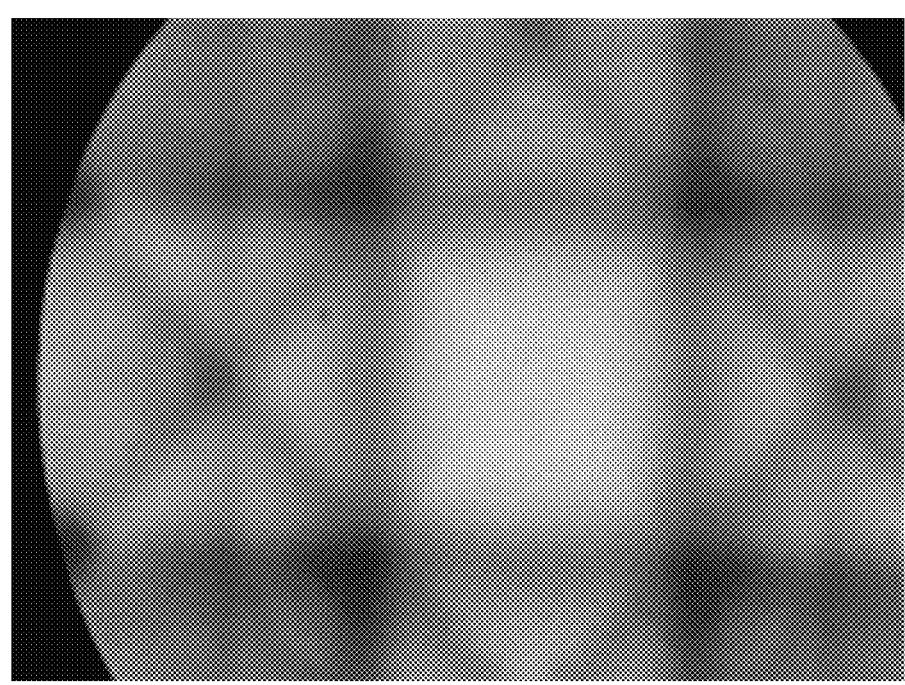
FIG. 6 illustrates an SACP captured using the acquisition process of FIG. 5 according to one example.

FIG. 6 illustrates an SACP 600 captured using the acquisition setup of FIG. 5 according to one example. In the example shown, the sample S is a Silicon-Germanium layer on a Silicon wafer. Fine details of the crystal structure, including crystal orientation and local lattice parameters, can be obtained from an SACP by analyzing the positions of contrast/intensity lines therein. In one example, a dictionary-based algorithm for determining crystal orientations from SACPs is used. Dictionary indexing of SACPs can be accomplished, e.g., by simulating patterns for all possible Euler angle combinations, with some finite step size in the orientation space. The algorithm run by the electronic controller 150 then operates to determine the best fit to the experimental SACP. A typical accuracy with which the crystal orientation is determined from an SACP, such as the SACP 600, via the dictionary-based algorithm is approximately 0.1 degrees. Other methods suitable for determining the crystal orientation from an SACP can also be applied to the SACP 600 to determine the crystal orientation of the sample S at the impact point 506 in various additional embodiments.

In some examples, instead of rocking the electron beam, the sample may be rocked to achieve various incident beam angles. In other examples, the SACP may be acquired by combined beam and sample rocking. In yet other examples, SACP may be formed by data acquired from different impact points, wherein the different impact points belong to the same crystal grain (or having the same crystal orientation).

Figure 7:
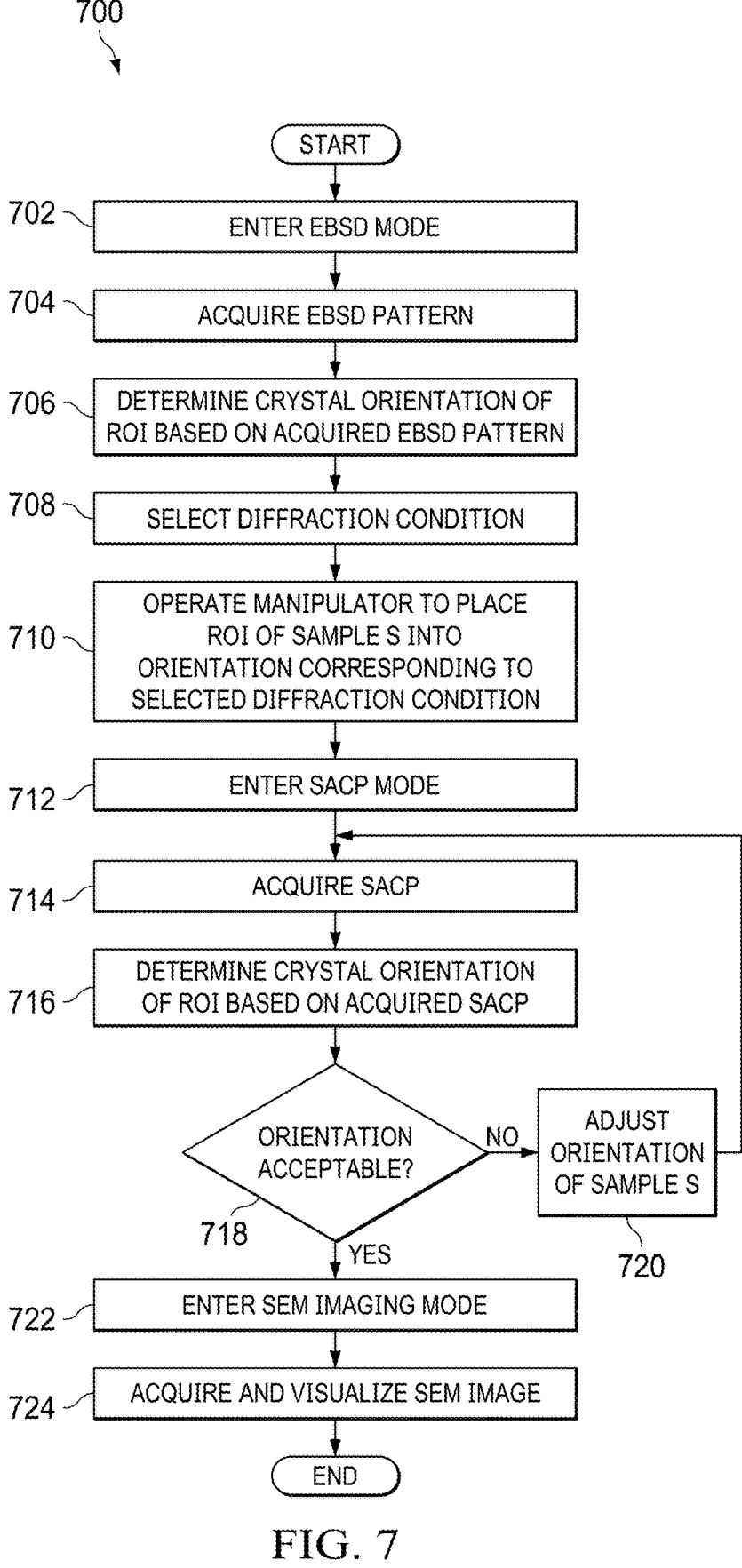
FIG. 7 is a flowchart illustrating an automated method of imaging lattice defects that can be implemented with the scientific instrument of FIG. 1 according to some embodiments.

FIG. 7 is a flowchart illustrating an automated method 700 of imaging lattice defects with the scientific instrument 100 or 200 according to some embodiments. The method 700 is described in continuing reference to FIGS. 1-6. Also note that the method 700 uses three different modalities of the scientific instrument, namely EBSD, SACP, and SEM-imaging modalities, as described in more detail below.

The method 700 includes configuring the scientific instrument 100 or 200 to operate in an EBSD mode (in a block 702). Such configuring mode may include positioning the retractable detector 210 over the sample, as indicated in FIG. 2. Operations of the block 702 also include the electronic controller 150 activating the retractable detector 210 and deactivating the detector 220 (if previously activated). In some examples, operations of the block 702 may also include tilting the sample S relative to the electron beam and acquiring a preliminary EBSD pattern with an EBSD detector.

The method 700 also includes the electronic controller 150 acquiring an EBSD pattern of the sample S (in a block 704). An example EBSD pattern that may be acquired in the block 704 is the EBSD pattern 400 of FIG. 4. Operations of the block 704 include the electronic controller 150 operating the SEM column 102 and the detector 210 to capture at least one EBSD pattern for a region of interest (ROI) of the sample S. Operations of the block 704 further include the electronic controller 150 receiving from the detector 210, via its output signal 212, an image frame containing the captured EBSD pattern. In some examples, the ROI is a selected crystal grain in a polycrystalline sample S. The crystal grain of interest may be identified and/or selected based on an SEM scan of the sample S. e.g., performed prior to the above-described operations of the block 702. In some other examples, the ROI is a selected portion of a monocrystalline sample S.

The method 700 also includes the electronic controller 150 determining the crystal orientation of the ROI based on the acquired EBSD (in a block 706). Herein, the crystal orientation may be determined in relation to the electron beam. Operations of the block 706 include the electronic controller 150 applying to the image frame received in the block 704 an EBSD-pattern processing algorithm, e.g., as described above in reference to FIG. 4. As already indicated above, a typical EBSD-pattern processing algorithm yields a crystal orientation of the ROI with an accuracy of approximately 1 to 2 degrees.

The method 700 also includes the electronic controller 150 selecting a diffraction condition (in a block 708). The diffraction condition corresponds to a target crystal orientation of the ROI with respect to the electron beam. For example, the ROI satisfies the electron channeling condition when being placed in the target crystal orientation. In some examples, the diffraction condition is selected based on the crystal orientation determined in 706. In some examples, the diffraction condition is selected in the block 708 based on an input from the operator. In some other examples, the diffraction condition is selected in the block 708 based on preprogrammed criteria that reflect a purpose of the SEM imaging performed in a subsequent SEM-imaging mode. In some cases, the diffraction condition is selected based on the defect type, space group, and other indicia of the target orientation of the ROI.

The method 700 also includes changing the orientation of the sample S (in a block 710). Operations of the block 710 include the electronic controller 150 computing the estimated first rotation angle ($R_1$) and the estimated second rotation angle ($R_2$) by which the sample manipulator of the sample holder 110 needs to rotate the sample S such that the crystal orientation of the ROI changes from the crystal orientation determined in the block 706 to the crystal orientation corresponding to the diffraction condition selected in the block 708. Operations of the block 710 further include the electronic controller 150 generating an appropriate control signal 158 for the sample manipulator of the sample holder 110 to perform the $R_1$ and $R_2$ rotations by the computed first and second rotation angles. In some examples, the generated control signal 158 may also include instructions for X, Y, and/or Z translations selected such that the impact point 506 for a subsequent SACP mode can be placed into the same ROI. In some examples, the translations are selected such that the impact point 506 can be substantially overlapped with the impact point 306 used for the operations of the block 704 (also see FIGS. 3 and 5).

The method 700 also includes configuring the scientific instrument 100 or 200 to operate in an SACP mode (in a block 712). Such configuring may include adjusting and/or retracting the BSE detector(s). In one example of the block 712, the detector 210 shown in FIG. 2 is retracted to obtain the detector configuration illustrated in FIG. 5. Operations of the block 712 also include the electronic controller 150 activating the detector 220.

The method 700 further includes the electronic controller 150 acquiring an SACP of the sample S (in a block 714). An example SACP that may be acquired in the block 714 is the SACP 600 shown in FIG. 6. Operations of the block 714 include the electronic controller 150 operating the SEM column 102 to rock the electron beam 114 at the impact point 506 and operating the BSE detector 220, e.g., as described above in reference to FIG. 5, to capture the SACP for the ROI of the sample S. In a representative example, the impact point 306 corresponding to the block 704 and the impact point 506 corresponding to the block 714 are located in the same crystal grain. In some examples, the impact point 306 corresponding to the block 704 and the impact point 506 corresponding to the block 714 may coincide or overlap. Operations of the block 704 further include the electronic controller 150 receiving from the BSE detector 220, via the signal 222, a stream of measurements representing the captured SACP.

The method 700 also includes the electronic controller 150 determining the crystal orientation of the ROI (in a block 716). Operations of the block 716 include the electronic controller 150 applying to the SACP received in the block 714 a suitable SACP processing algorithm, e.g., as described above in reference to FIG. 6. As already indicated above, a typical SACP processing algorithm yields a crystal orientation of the ROI with an accuracy of approximately 0.1 degrees.

In a decision block 718 of the method 700, the electronic controller 150 operates to determine whether or not the current crystal orientation of the ROI determined in the block 716 is sufficiently close to the target crystal orientation corresponding to the diffraction condition selected in the block 708. In some examples, this determination includes the electronic controller 150 computing an angular difference between the crystal orientation determined in the block 716 and the target crystal orientation corresponding to the diffraction condition selected in the block 708 and further includes comparing the magnitude of the computed angular difference with a threshold value. The current crystal orientation of the ROI is deemed acceptable when the computed angular difference is smaller than the threshold value and is deemed unacceptable otherwise. When the current orientation is unacceptable ("No" at the decision block 718), the processing of the method 700 is directed to a block 720. When the current orientation is acceptable ("Yes" at the decision block 718), the processing of the method 700 is directed to a block 722.

The method 700 includes adjusting the orientation of the sample S (in the block 720). Operations of the block 720 include the electronic controller 150 computing the estimated first rotation angle ($R_1$) and the estimated second rotation angle ($R_2$) by which the sample manipulator of the sample holder 110 needs to rotate the sample S such that the crystal orientation of the ROI changes from the crystal orientation determined in the block 716 to the target crystal orientation corresponding to the diffraction condition selected in the block 708. Operations of the block 720 further include the electronic controller 150 generating an appropriate control signal 158 for the sample manipulator to perform the $R_1$ and $R_2$ rotations by the computed first and second rotation angles. After the $R_1$ and $R_2$ rotations are completed, the processing of the method 700 is directed back to the block 714.

The method 700 also includes configuring the scientific instrument 100 to operate in an SEM-imaging mode (in the block 722). As already indicated above, the SEM-imaging mode also uses the BSE detector 220 for capturing BSE signals. The SEM-imaging mode differs from the SACP mode in that the SEM column 102 is now configured to scan the impact point of the electron beam 114 across the sample S without electron-beam rocking.

Figure 8:
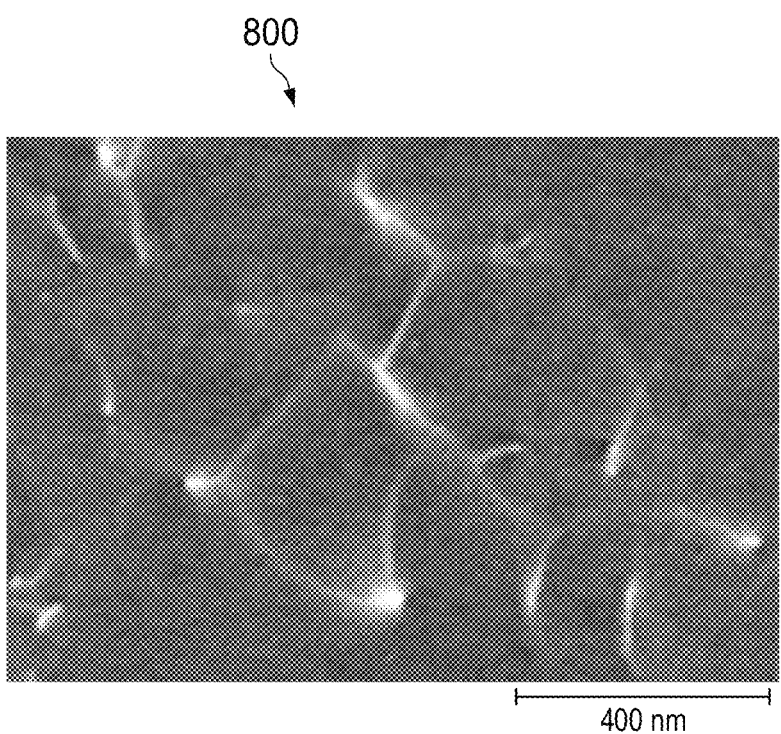
FIG. 8 illustrates an SEM image acquired using the method of FIG. 7 according to one example.

The method 700 further includes the electronic controller 150 acquiring an SEM image of the sample S (in a block 724). An example SEM image that may be acquired in the block 724 is illustrated in FIG. 8. Operations of the block 724 include the electronic controller 150 operating the SEM column 102 to scan the electron beam 114 across the sample S in a raster pattern and operating the BSE detector 220 to capture the BSE signals corresponding to different scan-pixel locations on the sample S. Operations of the block 724 further include the electronic controller 150 receiving from the BSE detector 220, via the signal 222, a stream of measurements representing the captured BSE signals. Based on the received stream of measurements, the electronic controller 150 operates to populate a corresponding image frame suitable for rendering and visualization, e.g., on a display device connected thereto. Upon completion of the operations of the block 724, the method 700 is terminated.

In some examples, the method 700 may be repeated one or more times, e.g., for different respective ROIs of the sample S.

In some embodiments of the method 700, the blocks 722, 724 may be absent. In some other embodiments of the method 700, the blocks 722, 724 may be replaced by operations representing a different application in which a precise orientation of the sample S obtained via operations of the blocks 702-720 is useful. In some examples, such a different application is selected from the group consisting of lamella extraction and milling/processing a 3D structure based on the sample's crystal orientation. FIG. 8 illustrates an SEM image 800 acquired in the block 724 of the method 700 according to one example. In the example shown, the sample S is Silicon-Germanium layer on a Silicon wafer. Due to the nearly perfect crystal orientation of the ROI of the sample S into the selected Bragg condition, a high contrast for visualizing various lattice defects via the ECCI effect is achieved. For example, several dislocations in the sample S are clearly visualized in the image 800 as bright lines and bright areas.

Figure 9:
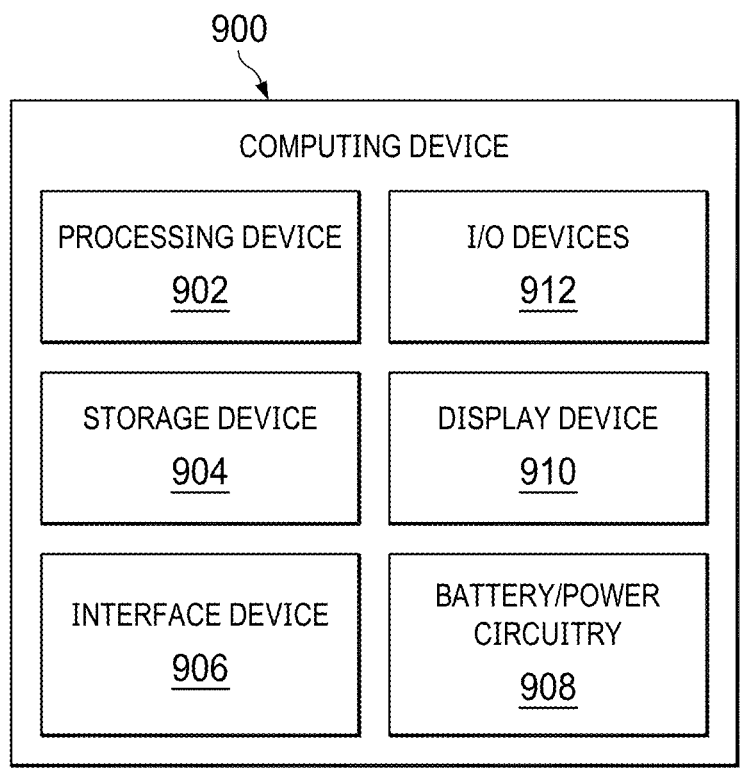
FIG. 9 is a block diagram of an example computing device configured to perform at least some scientific-instrument support operations in accordance with various embodiments.

FIG. 9 is a block diagram of an example computing device 900 configured to perform at least some scientific-instrument support operations in accordance with various embodiments. For example, in some embodiments, the computing device 900 performs at least some operations of the electronic controller 150 (also see FIGS. 1, 2, and 7). In various embodiments, a support module of the scientific instrument 100 may be implemented by a single computing device 900 or by multiple computing devices 900.

The computing device 900 of FIG. 9 is illustrated as having a number of components, but any one or more of these components may be omitted or duplicated, as suitable for the application and setting. In some embodiments, some or all of the components included in the computing device 900 may be attached to one or more motherboards and enclosed in a housing. In some embodiments, some of those components may be fabricated onto a single system-on-a-chip (SoC) (e.g., the SoC may include one or more processing devices 902 and one or more storage devices 904). Additionally, in various embodiments, the computing device 900 may not include one or more of the components illustrated in FIG. 9, but may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 900 may not include a display device 910, but may include display device interface circuitry (e.g., a connector and driver circuitry) to which an external display device 910 may be coupled.

The computing device 900 includes a processing device 902 (e.g., one or more processing devices). As used herein, the term "processing device" refers to any device or portion of a device that processes electronic data from registers and/or memory to transform that electronic data into other electronic data that may be stored in registers and/or memory. In various embodiments, the processing device 902 may include one or more digital signal processors (DSPs), application-specific integrated circuits (ASICs), central processing units (CPUs), graphics processing units (GPUs), server processors, or any other suitable processing devices.

The computing device 900 also includes a storage device 904 (e.g., one or more storage devices). In various embodiments, the storage device 904 may include one or more memory devices, such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 904 may include memory that shares a die with the processing device 902. In such an embodiment, the memory may be used as cache memory and include embedded dynamic random-access memory (eDRAM) or spin transfer torque magnetic random-access memory (STT-MRAM), for example. In some embodiments, the storage device 904 may include non-transitory computer readable media having instructions thereon that, when executed by one or more processing devices (e.g., the processing device 902), cause the computing device 900 to perform any appropriate ones of the methods disclosed herein below or portions of such methods.

The computing device 900 further includes an interface device 906 (e.g., one or more interface devices 906). In various embodiments, the interface device 906 may include one or more communication chips, connectors, and/or other hardware and software to govern communications between the computing device 900 and other computing devices. For example, the interface device 906 may include circuitry for managing wireless communications for the transfer of data to and from the computing device 900. The term "wireless" and its derivatives may be used to describe circuits, devices, systems, methods, techniques, communications channels, etc., that may communicate data via modulated electromagnetic radiation through a nonsolid medium. The term does not imply that the associated devices do not contain any wires, although in some embodiments they might not. Circuitry included in the interface device 906 for managing wireless communications may implement any of a number of wireless standards or protocols, including but not limited to Institute for Electrical and Electronic Engineers (IEEE) standards including Wi-Fi (IEEE 802.11 family), IEEE 802.16 standards, Long-Term Evolution (LTE) project along with any amendments, updates, and/or revisions (e.g., advanced LTE project, ultramobile broadband (UMB) project (also referred to as "3GPP2"), etc.). In some embodiments, circuitry included in the interface device 906 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 906 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 906 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 906 may include one or more antennas (e.g., one or more antenna arrays) configured to receive and/or transmit wireless signals.

In some embodiments, the interface device 906 may include circuitry for managing wired communications, such as electrical, optical, or any other suitable communication protocols. For example, the interface device 906 may include circuitry to support communications in accordance with Ethernet technologies. In some embodiments, the interface device 906 may support both wireless and wired communication, and/or may support multiple wired communication protocols and/or multiple wireless communication protocols. For example, a first set of circuitry of the interface device 906 may be dedicated to shorter-range wireless communications such as Wi-Fi or Bluetooth, and a second set of circuitry of the interface device 906 may be dedicated to longer-range wireless communications such as global positioning system (GPS), EDGE, GPRS, CDMA, WiMAX, LTE, EV-DO, or others. In some other embodiments, a first set of circuitry of the interface device 906 may be dedicated to wireless communications, and a second set of circuitry of the interface device 906 may be dedicated to wired communications.

The computing device 900 also includes battery/power circuitry 908. In various embodiments, the battery/power circuitry 908 may include one or more energy storage devices (e.g., batteries or capacitors) and/or circuitry for coupling components of the computing device 900 to an energy source separate from the computing device 900 (e.g., to AC line power).

The computing device 900 also includes a display device 910 (e.g., one or multiple individual display devices). In various embodiments, the display device 910 may include any visual indicators, such as a heads-up display, a computer monitor, a projector, a touchscreen display, a liquid crystal display (LCD), a light-emitting diode display, or a flat panel display.

The computing device 900 also includes additional input/output (I/O) devices 912. In various embodiments, the I/O devices 912 may include one or more data/signal transfer interfaces, audio I/O devices (e.g., microphones or microphone arrays, speakers, headsets, earbuds, alarms, etc.), audio codecs, video codecs, printers, sensors (e.g., thermocouples or other temperature sensors, humidity sensors, pressure sensors, vibration sensors, etc.), image capture devices (e.g., one or more cameras), human interface devices (e.g., keyboards, cursor control devices, such as a mouse, a stylus, a trackball, or a touchpad), etc.

Depending on the specific embodiment of the scientific instrument 100 and/or of the instrument portion 200, various components of the interface devices 906 and/or I/O devices 912 can be configured to output suitable control signals (e.g., 152, 154, 156) for various components of the scientific instrument 100, receive suitable control/telemetry signals from various components of the scientific instrument 100, and receive streams of measurements (e.g., 162, 172, 182) from various detectors of the scientific instrument 100. In some examples, the interface devices 906 and/or I/O devices 912 include one or more analog-to-digital converters (ADCs) for transforming received analog signals into a digital form suitable for operations performed by the processing device 902 and/or the storage device 904. In some additional examples, the interface devices 906 and/or I/O devices 912 include one or more digital-to-analog converters (DACs) for transforming digital signals provided by the processing device 902 and/or the storage device 904 into an analog form suitable for being communicated to the corresponding components of the scientific instrument 100.

According to one example disclosed above, e.g., in the summary section and/or in reference to any one or any combination of some or all of FIGS. 1-9, provided is a scientific instrument comprising: a manipulator configured to controllably rotate a sample about a first rotation axis and about a second rotation axis oriented at a non-zero angle with respect to the first rotation axis; an electron-beam column configured to direct an electron beam to a selected impact point on the sample; a first detector configurable to detect an angularly resolved pattern of back-scattered electrons emitted from the selected impact point in response to the electron beam; a second detector configured to detect a flux of back-scattered electrons emitted from the selected impact point in response to the electron beam; and an electronic controller configured to: determine a first crystal orientation of a region of interest (ROI) within the sample based on the angularly resolved pattern of back-scattered electrons acquired with the first detector when the electron-beam column is operated to keep the electron beam at a first fixed impact point within the ROI; operate the manipulator to place the ROI into a second crystal orientation in which an angular difference between the determined first crystal orientation and a target crystal orientation is estimated to be substantially canceled; and determine the second crystal orientation based on a first selected area electron channeling pattern (SACP) acquired with the second detector when the electron-beam column is operated to rock the electron beam at a second fixed impact point within the ROI.

In some examples of the above scientific instrument, the electronic controller is further configured to compare an angular difference between the determined second crystal orientation and the target crystal orientation with a threshold value.

In some examples of any of the above scientific instruments, when the angular difference between the determined second crystal orientation and the target crystal orientation is smaller than the threshold value, the electronic controller is configured to: operate the SEM column to scan the electron beam across the sample; and acquire an SEM image of the sample based on back-scattered electron signals generated by the second detector during the electron-beam scan.

In some examples of any of the above scientific instruments, when the angular difference between the determined second crystal orientation and the target crystal orientation is greater than the threshold value, the electronic controller is configured to operate the manipulator to place the ROI into a third crystal orientation in which the angular difference between the determined second crystal orientation and the target crystal orientation is estimated to be substantially canceled.

In some examples of any of the above scientific instruments, the electronic controller is further configured to: determine the third crystal orientation based on a second SACP acquired with the second detector when the electron-beam column is operated to rock the electron beam at a third fixed impact point within the ROI; and compare an angular difference between the determined third crystal orientation and the target crystal orientation with the threshold value.

In some examples of any of the above scientific instruments, when the angular difference between the determined third crystal orientation and the target crystal orientation is smaller than the threshold value, the electronic controller is configured to: operate the SEM column to scan the electron beam across the sample; and acquire an SEM image of the sample based on back-scattered electron signals generated by the second detector during the electron-beam scan.

In some examples of any of the above scientific instruments, when an angular difference between the determined third crystal orientation and the target crystal orientation is greater than the threshold value, the electronic controller is configured to operate the manipulator to place the ROI into a fourth crystal orientation in which the angular difference between the determined third crystal orientation and the target crystal orientation is estimated to be substantially canceled.

In some examples of any of the above scientific instruments, the manipulator is further configured to controllably translate the sample along first, second, and third noncolinear directions; and wherein the electronic controller is further configured to operate the manipulator such that the first and second fixed impact points are collocated.

In some examples of any of the above scientific instruments, the electronic controller is configured to select the target orientation based on a Bragg diffraction condition for a selected set of crystal-lattice planes of the sample.

In some examples of any of the above scientific instruments, the angularly resolved pattern causes the electronic controller to determine the first crystal orientation with a first accuracy; and wherein the first SACP causes the electronic controller to determine the second crystal orientation with a second accuracy that is finer than the first accuracy.

In some examples of any of the above scientific instruments, the second accuracy is finer than the first accuracy by at least a factor of ten.

According to another example disclosed above, e.g., in the summary section and/or in reference to any one or any combination of some or all of FIGS. 1-9, provided is an automated method, comprising: determining a first crystal orientation of a region of interest (ROI) within a sample based on an angularly resolved pattern of back-scattered electrons acquired with a first detector when an electron-beam column is operated to keep an electron beam at a first fixed impact point within the ROI; operating a manipulator to place the ROI into a second crystal orientation in which an angular difference between the determined first crystal orientation and a target crystal orientation is estimated to be substantially canceled, the manipulator being configured to controllably rotate the sample about a first rotation axis and about a second rotation axis oriented at a non-zero angle with respect to the first rotation axis; and determining the second crystal orientation based on a first selected area electron channeling pattern (SACP) acquired with a second detector when the electron-beam column is operated to rock the electron beam at a second fixed impact point within the ROI, the second detector being configured to detect a flux of back-scattered electrons emitted from a selected impact point in the sample in response to the electron beam.

In some examples of the above automated method, the automated method further comprises comparing an angular difference between the determined second crystal orientation and the target crystal orientation with a threshold value.

In some examples of any of the above automated methods, the automated method further comprises: when the angular difference between the determined second crystal orientation and the target crystal orientation is smaller than the threshold value, operating the SEM column to scan the electron beam across the sample and acquiring an SEM image of the sample based on back-scattered electron signals generated by the second detector during the electron-beam scan.

In some examples of any of the above automated methods, the automated method further comprises: when the angular difference between the determined second crystal orientation and the target crystal orientation is greater than the threshold value, operating the manipulator to place the ROI into a third crystal orientation in which the angular difference between the determined second crystal orientation and the target crystal orientation is estimated to be substantially canceled.

In some examples of any of the above automated methods, the automated method further comprises: determining the third crystal orientation based on a second SACP acquired with the second detector when the electron-beam column is operated to rock the electron beam at a third fixed impact point within the ROI; and comparing an angular difference between the determined third crystal orientation and the target crystal orientation with the threshold value.

In some examples of any of the above automated methods, the automated method further comprises: when the angular difference between the determined third crystal orientation and the target crystal orientation is smaller than the threshold value, operating the SEM column to scan the electron beam across the sample and acquiring an SEM image of the sample based on back-scattered electron signals generated by the second detector during the electron-beam scan.

In some examples of any of the above automated methods, the automated method further comprises: when an angular difference between the determined third crystal orientation and the target crystal orientation is greater than the threshold value, operating the manipulator to place the ROI into a fourth crystal orientation in which the angular difference between the determined third crystal orientation and the target crystal orientation is estimated to be substantially canceled.

In some examples of any of the above automated methods, the automated method further comprises selecting the target orientation based on a Bragg diffraction condition for a selected set of crystal-lattice planes of the sample.

According to yet another example disclosed above, e.g., in the summary section and/or in reference to any one or any combination of some or all of FIGS. 1-9, provided is a non-transitory computer-readable medium storing instructions that, when executed by a computing device, cause the computing device to perform operations comprising any one of the above automated methods.

According to yet another example disclosed above, e.g., in the summary section and/or in reference to any one or any combination of some or all of FIGS. 1-9, provided is a scientific instrument comprising: a manipulator configured to controllably rotate a sample about a first rotation axis and about a second rotation axis oriented at a non-zero angle with respect to the first rotation axis; an electron-beam column configured to direct an electron beam to a selected impact point on the sample; one or more detectors configurable to detect an angularly resolved pattern of back-scattered electrons emitted from the selected impact point in response to the electron beam and further configurable to detect a flux of back-scattered electrons emitted from the selected impact point in response to the electron beam; and an electronic controller configured to: determine a first crystal orientation of a ROI within the sample based on the angularly resolved pattern of back-scattered electrons acquired with the one or more detectors when the electron-beam column is operated to keep the electron beam at a first fixed impact point within the ROI; operate the manipulator to place the ROI into a second crystal orientation in which an angular difference between the determined first crystal orientation and a target crystal orientation is estimated to be substantially canceled; and determine the second crystal orientation based on a first SACP acquired with the one or more detectors when the electron-beam column is operated to rock the electron beam at a second fixed impact point within the ROI.

In some examples of the above scientific instrument, the one or more detectors are implemented using a single movable pixelated BSE detector.

In some examples of any of the above scientific instruments, the one or more detectors include a first detector configurable to detect the angularly resolved pattern of back-scattered electrons emitted from the selected impact point in response to the electron beam; and a second detector configured to detect the flux of back-scattered electrons emitted from the selected impact point in response to the electron beam.

In some examples of any of the above scientific instruments, the first detector is retractable.

In some examples of any of the above scientific instruments, the second detector is fixed or retractable.

According to yet another example disclosed above, e.g., in the summary section and/or in reference to any one or any combination of some or all of FIGS. 1-9, provided is an automated method, comprising: determining a first crystal orientation of a ROI within a sample based on an angularly resolved pattern of back-scattered electrons acquired with one or more detectors when an electron-beam column is operated to keep an electron beam at a first fixed impact point within the ROI; operating a manipulator to place the ROI into a second crystal orientation in which an angular difference between the determined first crystal orientation and a target crystal orientation is estimated to be substantially canceled, the manipulator being configured to controllably rotate the sample about a first rotation axis and about a second rotation axis oriented at a non-zero angle with respect to the first rotation axis; and determining the second crystal orientation based on a first SACP acquired with the one or more detectors when the electron-beam column is operated to rock the electron beam at a second fixed impact point within the ROI, the one or more detectors being configured to detect a flux of back-scattered electrons emitted from a selected impact point in the sample in response to the electron beam.

According to yet another example disclosed above, e.g., in the summary section and/or in reference to any one or any combination of some or all of FIGS. 1-9, provided is a scientific instrument, comprising: an electron-beam column configured to direct an electron beam to a sample; a manipulator configured to adjust an orientation of the sample with respect to the electron beam; one or more detectors to detect back-scattered electrons from the sample; and an electronic controller including a processor and a memory for storing program code, wherein the memory and the program code are configured to, with the processor, cause the scientific instrument at least to: direct the electron beam toward a region of interest (ROI) of the sample and acquire at least one electron backscatter diffraction (EBSD) pattern with the one or more detectors; determine a first crystal orientation based on the at least one EBSD pattern; adjust, via the manipulator, the orientation of the sample toward a target crystal orientation based on the first crystal orientation; direct the electron beam toward the ROI and acquire a first selected area electron channeling pattern (SACP) with the one or more detectors; determine a second crystal orientation based on the first SACP; and adjust, via the manipulator, the orientation of the sample toward the target crystal orientation based on the second crystal orientation.

In some examples of the above scientific instrument, the memory and the program code are further configured to, with the processor, cause the scientific instrument to acquire a sample image including the ROI after the orientation of the sample is adjusted based on the first crystal orientation and the second crystal orientation.

In some examples of any of the above scientific instruments, the sample image is an SEM image showing crystal defects of the sample.

In some examples of any of the above scientific instruments, the at least one EBSD pattern includes an angularly resolved pattern of back-scattered electrons emitted from the ROI in response to the electron beam.

In some examples of any of the above scientific instruments, the first SACP represents a flux of back-scattered electrons emitted from the ROI while the electron beam is being rocked thereat.

In some examples of any of the above scientific instruments, the memory and the program code are further configured to, with the processor, cause the scientific instrument to acquire a sample image including the ROI after adjusting the orientation of the sample based on the first SACP.

In some examples of any of the above scientific instruments, to adjust the orientation of the sample toward a target crystal orientation based on the EBSD the scientific instrument is configured to: determine a first crystal orientation based on the EBSD, and adjust the orientation of the sample based on the first crystal orientation.

In some examples of any of the above scientific instruments, to direct the electron beam toward the ROI and acquire at least one EBSD pattern the scientific instrument is configured to: direct the electron beam towards a first impact point within the ROI and acquire the EBSD pattern, and to direct the electron beam toward the ROI and to acquire the first SACP the scientific instrument is configured to direct the electron beam towards a second impact point within the ROI and acquire the first SACP, and wherein the sample at the first impact point and the second impact point has the same crystal orientation.

In some examples of any of the above scientific instruments, the scientific instrument is further configured to select the ROI based on a scanning electron microscopy (SEM) image of the sample before acquiring the EBSD pattern.

In some examples of any of the above scientific instruments, the target crystal orientation corresponds to a diffraction condition selected based on the EBSD.

In some examples of any of the above scientific instruments, an accuracy of the orientation of the sample toward the target crystal orientation is lower than an accuracy of the orientation of the sample toward the target crystal orientation based on the first SACP.

In some examples of any of the above scientific instruments, the one or more detectors includes a first retractable detector for acquiring the EBSD and a second detector for acquiring the first SACP, the first retractable detector is positioned between the sample and a polepiece of an electron column for generating the electron beam, and wherein the memory and the program code are configured to, with the processor, cause the scientific instrument at least to: retract the first detector before directing the electron beam towards the ROI and acquiring the first SACP.

In some examples of any of the above scientific instruments, the EBSD is acquired by positioning the one or more detectors substantially normal to a beam axis of the electron beam.

It is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter incorporate more features than are expressly recited in each claim. Rather, as the following claims reflect, inventive subject matter lies in fewer than all features of a single disclosed example. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting." which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A scientific instrument, comprising:
an electron-beam column configured to direct an electron beam to a sample;
a manipulator configured to adjust an orientation of the sample with respect to the electron beam;
one or more detectors to detect back-scattered electrons from the sample; and an electronic controller including a processor and a memory for storing program code,
wherein the memory and the program code are configured to, with the processor, cause the scientific instrument at least to:
direct the electron beam toward a region of interest (ROI) of the sample and acquire at least one electron backscatter diffraction (EBSD) pattern with the one or more detectors;
adjust, via the manipulator, the orientation of the sample toward a target crystal orientation based on the EBSD;
direct the electron beam toward the ROI and acquire a first selected area electron channeling pattern (SACP) with the one or more detectors; and
adjust, via the manipulator, the orientation of the sample toward the target crystal orientation based on the first SACP.

2. The scientific instrument of claim 1, wherein the memory and the program code are further configured to, with the processor, cause the scientific instrument to acquire a sample image including the ROI after adjusting the orientation of the sample based on the first SACP.

3. The scientific instrument of claim 1, wherein adjust the orientation of the sample toward a target crystal orientation based on the EBSD includes: determine a first crystal orientation based on the EBSD, and adjust the orientation of the sample based on the first crystal orientation.

4. The scientific instrument of claim 1, wherein direct the electron beam toward the ROI and acquire at least one EBSD pattern includes direct the electron beam towards a first impact point within the ROI and acquire the EBSD pattern, and wherein direct the electron beam toward the ROI and acquire the first SACP includes direct the electron beam towards a second impact point within the ROI and acquire the first SACP, and wherein the sample at the first impact point and the second impact point has the same crystal orientation.

5. The scientific instrument of claim 4, wherein the scientific instrument is further configured to select the ROI based on a scanning electron microscopy (SEM) image of the sample before acquiring the EBSD pattern.

6. The scientific instrument of claim 1, wherein the target crystal orientation corresponds to a diffraction condition selected based on the EBSD.

7. The scientific instrument of claim 1, wherein an accuracy of the orientation of the sample toward the target crystal orientation is lower than an accuracy of the orientation of the sample toward the target crystal orientation based on the first SACP.

8. The scientific instrument of claim 1, wherein the one or more detectors includes a first retractable detector for acquiring the EBSD and a second detector for acquiring the first SACP, the first retractable detector is positioned between the sample and a polepiece of an electron column for generating the electron beam, and wherein the memory and the program code are configured to, with the processor, cause the scientific instrument at least to: retract the first detector before directing the electron beam towards the ROI and acquiring the first SACP.

9. The scientific instrument of claim 1, wherein the EBSD is acquired by positioning the one or more detectors substantially normal to a beam axis of the electron beam.

10. A scientific instrument, comprising:

a manipulator configured to controllably rotate a sample about a first rotation axis and about a second rotation axis oriented at a non-zero angle with respect to the first rotation axis;

an electron-beam column configured to direct an electron beam to a selected impact point on the sample;

one or more detectors configurable to detect an angularly resolved pattern of back-scattered electrons emitted from the selected impact point in response to the electron beam and further configurable to detect a flux of back-scattered electrons emitted from the selected impact point in response to the electron beam; and an electronic controller configured to:

determine a first crystal orientation of a region of interest (ROI) within the sample based on an electron backscatter diffraction (EBSD) pattern acquired with the one or more detectors when the electron-beam column is operated to direct the electron beam at a first impact point within the ROI;

operate the manipulator to place the ROI into a second crystal orientation to substantially cancel an angular difference between the determined first crystal orientation and a target crystal orientation; and determine the second crystal orientation based on a first selected area electron channeling pattern (SACP) acquired with the one or more detectors when the scientific instrument is operated to direct the electron beam at a second impact point within the ROI.

11. The scientific instrument of claim 10, wherein the electronic controller is further configured to compare an angular difference between the determined second crystal orientation and the target crystal orientation with a threshold value.

12. The scientific instrument of claim 11, wherein, when the angular difference between the determined second crystal orientation and the target crystal orientation is smaller than the threshold value, the electronic controller is configured to:

operate the electron-beam column to scan the electron beam across the sample; and acquire an SEM image of the sample based on back-scattered electron signals detected by the one or more detectors during the electron-beam scan.

13. The scientific instrument of claim 11, wherein, when the angular difference between the determined second crystal orientation and the target crystal orientation is greater than the threshold value, the electronic controller is configured to operate the manipulator to place the ROI into a third crystal orientation to substantially cancel the angular difference between the determined second crystal orientation and the target crystal orientation.

14. The scientific instrument of claim 10, wherein the manipulator is further configured to controllably translate the sample along first, second, and third noncolinear directions; and wherein the electronic controller is further configured to operate the manipulator such that the first and second impact points are substantially co-located.

15. The scientific instrument of claim 10, wherein the electronic controller is configured to select the target crystal orientation based on a Bragg diffraction condition for a selected set of crystal-lattice planes of the sample.

16. The scientific instrument of claim 10, wherein the one or more detectors are implemented using a single pixelated back-scattered-electron detector.

17. A method, comprising:

acquiring an electron backscatter diffraction pattern (EBSD) with one or more detectors when an electron-beam column is operated to direct an electron beam at a first impact point within a region of interest (ROI) of a sample held by a sample holder;

determining a first crystal orientation of the ROI based on the acquired EBSD;

operating a manipulator coupled to the sample holder to place the ROI into a second crystal orientation to substantially cancel an angular difference between the determined first crystal orientation and a target crystal orientation;

acquiring a first selected area electron channeling pattern (SACP) of the ROI placed in the second crystal orientation with the one or more detectors when the electron beam is operated to direct the electron beam at a second impact point within the ROI; and determining the second crystal orientation based on the acquired first SACP.

18. The method of claim 17, further comprising:

comparing an angular difference between the determined second crystal orientation and the target crystal orientation with a threshold value;

in response to the angular difference smaller than the threshold value, operating the electron-beam column to scan the electron beam across the sample and acquiring an SEM image of the sample; and in response to the angular difference greater than the threshold value, operating the manipulator to place the ROI into a third crystal orientation to substantially cancel the angular difference.

19. The method of claim 17, wherein the sample is not removed from the sample holder between acquiring the EBSD and the SACP.

20. The method of claim 17, further comprising selecting the target crystal orientation based on the acquired EBSD.

\* \* \* \* \*